UNITED STATES PATENT OFFICE.

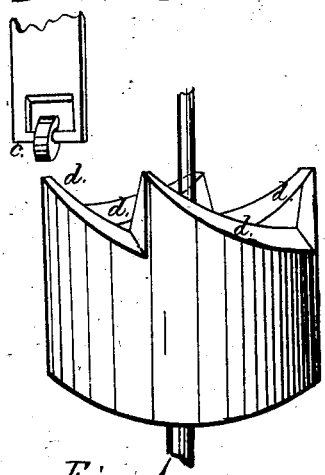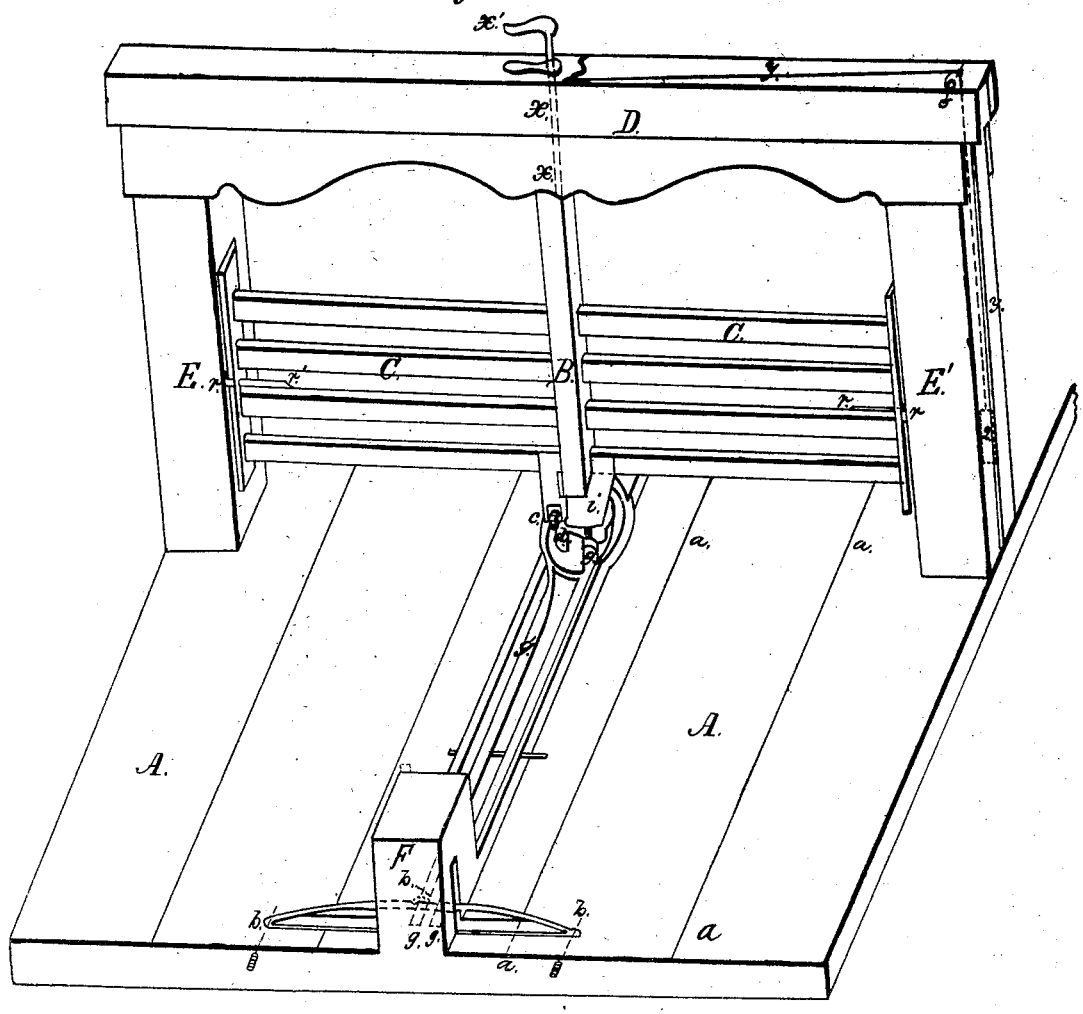

WILLIAM G. PHILIPS, OF NEWPORT, DELAWARE.

METHOD OF OPENING AND CLOSING GATES.

Specification forming part of Letters Patent No. 10,593, dated March 7, 1854; Reissued August 21, 1855, No. 324.

*To all whom it may concern:*

Be it known that I, WILLIAM G. PHILIPS, of the town of Newport and State of Delaware, have invented a new and Improved Self Opening and Closing Gate; and I do hereby declare that the following is a full and exact description.

The nature of my invention consists in providing the gate post—or pivot—and the platform with springs, so arranged that a vehicle passing on to the platform will press upon a spring and so open the gate as to allow you to pass through, and in going from the platform on the opposite side, another spring is pressed by the carriage which causes the gate to close.

To enable others skilled in the art to make and use my invention I will proceed to describe its construction and operation.

The gate, when open, rests in the position of the passage track and when closed, directly at right angles with the same. A platform A, Figure 1, supports the whole working apparatus and is of sufficient width for the passage of the carriage on each side of the gate post B, Fig. 1. The gate C, Fig. 1, is hung at its center upon one gate post B, which is kept in an upright position by a bolt passing from it through a cross beam D, Fig. 1, above and which beam is supported by two uprights E E', Fig. 1, springing from the platform A, Fig. 1, on the outer side of each carriage way. Attached to the gate on each side of the gate post are two friction rollers, $c$, Figs. 1 and 2. These rollers rest and act upon four inclined planes, $d$, Figs. 1 and 3. These planes are each one fourth the circumference of the circle in extent. Crossing the inner carriage track and projecting above the platform is a lever, $b$, Fig. 1, which rests upon another lever $g'$ $g$, Fig. 1, running in the direction of the tracks and between them: the inner end of the lever, at $g'$, curves upward. Projecting from the bottom of the gate at the gate post is a plate, $i$, Fig. 1, and is directly over the inner end $g'$ of the lever $g$ $g'$, Fig. 1. Attached to each of the four posts E E F, Fig. 1 is a spring catch, $r$, Fig. 1, and on the gate at each end is also a spring catch $r$. The inclined planes rest upon a pivot and are allowed the horizontal play of about one eighth of a circle regulated by a pin and traverse and acted upon by a spring so that when the gate is lifted the planes move in a contrary direction to that of the gate.

To show the operation, a carriage passing upon the platform, the inner wheel runs upon and presses downward the lever $b$, Fig. 1, which pressing upon the lever $g$ $g'$, Fig. 1, raises the end $g'$ which acting upward against the plate $i$ raises the gate, the friction roller $c$ is thus placed upon the upper side of one of the inclined planes and the gate moves round one fourth of a circle, allowing the carriage to pass through, and in so doing it passes over a lever at the other end of the platform corresponding with $b$ $b$, Fig. 1, which raises the gate up in in the same way and closes it by moving it around another quarter of the circle where it is stopped or fastened by the catch $r'$ on the gate meeting with the catch $r$ upon the uprights E E'. The gate is made to act by placing a weight upon the pin $x$, Fig. 1, projecting upward from the gate post, or it may be done by a crank $x'$, Fig. 1, attached to the same having a cord $y$, Fig. 1, and pulley $z$, Fig. 1, passing over and within one of the gate posts and so that the cord may be wound around the crank.

What I claim as my invention and desire to secure by Letters Patent is—

The double span rotating gate opening and closing continually forward by means of levers and inclined planes as well as by pulleys and cords, combined and arranged as is herein set forth.

WM. G. PHILIPS.

In presence of—
  DANIEL CHAPLIN,
  JOHN W. GUIREY.

[FIRST PRINTED 1913.]